US005351057A

United States Patent [19]

Hansen

[11] Patent Number: 5,351,057
[45] Date of Patent: Sep. 27, 1994

[54] DIRECTIVE OPTIMIZATION OF COHERENT SIDELOBE CANCELLER SYSTEMS

[75] Inventor: James P. Hansen, Waldorf, Md.

[73] Assignee: The United States of America as represented by the Secretary of the Navy, Washington, D.C.

[21] Appl. No.: 528,194

[22] Filed: Nov. 25, 1974

[51] Int. Cl.$^5$ .......................... G01S 3/16; G01S 3/28
[52] U.S. Cl. .................................... 342/378
[58] Field of Search ................ 343/100 LE, 100 SA, 343/100 CL, 753, 754, 757, 854; 342/378

[56] References Cited

U.S. PATENT DOCUMENTS 3,090,956  5/1963  Woodward, Jr. et al. ... 343/100 SA
3,177,489  4/1965  Saltzberg ........................ 343/100 LE
3,202,990  8/1965  Howells .......................... 343/100 CL
3,560,985  2/1971  Lyon ............................. 343/100 SA Primary Examiner—Theodore M. Blum
Attorney, Agent, or Firm—Thomas E. McDonnell

[57] ABSTRACT

A new technique for improving the operation of a interference suppression system, particularly in a side-lobe canceller system, against multiple interference sources. A plurality of auxiliary receiving antennas, providing interference signals to side-lobe canceller loops, are spaced about a main directional receiving antenna and positioned to preferably form a configuration such that no lines of sight through any two auxiliary antennas are collinear or parallel to a line of sight through any other two auxiliary antennas. The configuration is then arranged relative to the main antenna such that no lines through any two auxiliary antennas are substantially parallel with the primary direction of a multiple jammer attack.

8 Claims, 1 Drawing Sheet

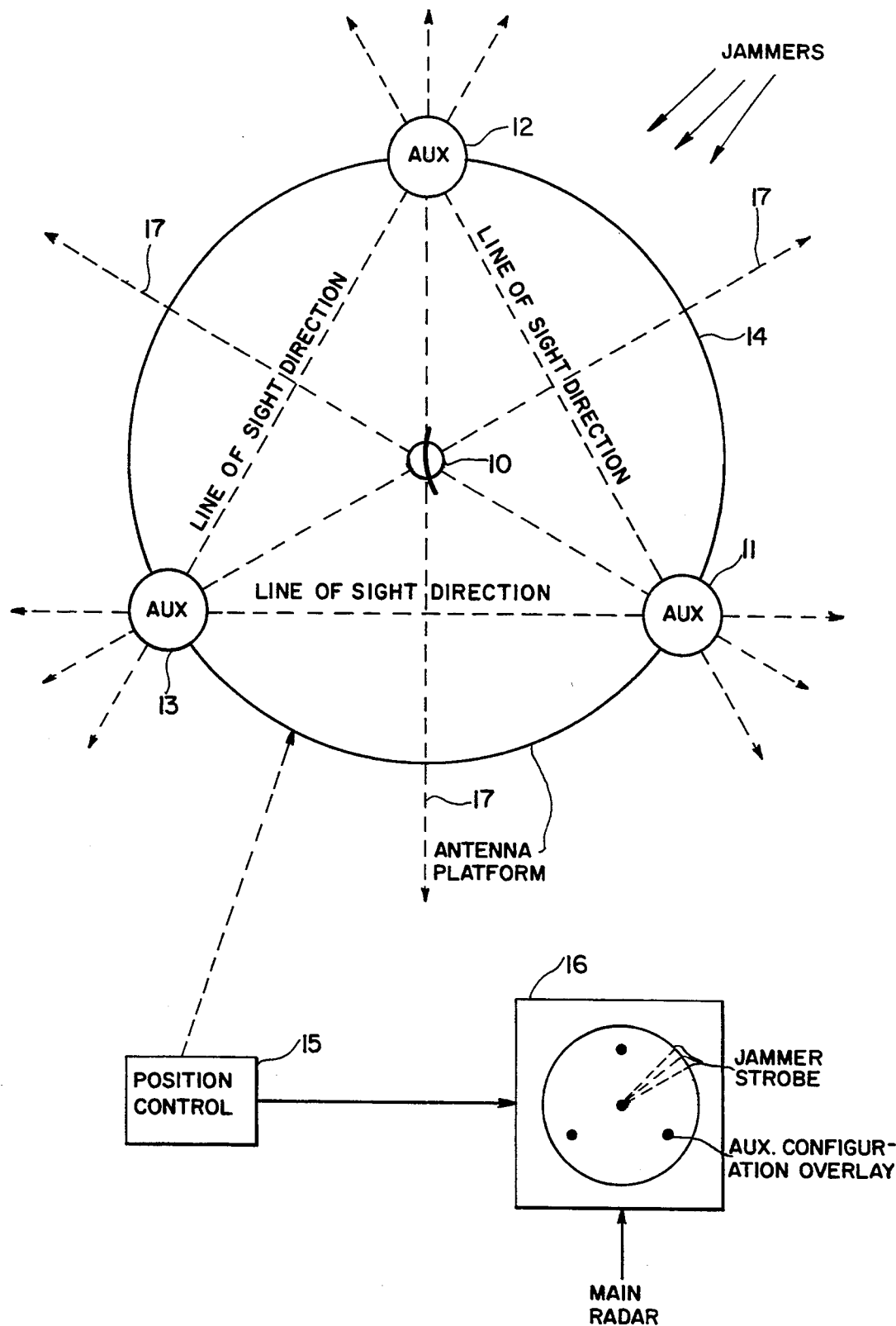

DIRECTIVE OPTIMIZATION OF COHERENT SIDELOBE CANCELLER SYSTEMS

BACKGROUND OF THE INVENTION

The present invention relates to improvements in interference suppression systems and more particularly to improved techniques for sampling the interference in a multiple signal environment.

Conventional interference suppression systems, for example, side-lobe canceller systems, act to isolate signals received by the main lobe of an antenna from interference that may be present in the side-lobes. Usually, such systems as exampled by U. S. Pat. 3,202,990, employing auxiliary antennas no sample the interference environment, have worked well to eliminate interference received by the main antenna when signals from only one interference source are present and supplied to a single canceller loop. However, when multiple interference sources are present, conventional systems have been less effective in reducing interference even where multiple canceller loops have been used.

In theory, if N independent interference sources are present forming a signal environment, the interference signals may be cancelled from the desired signal in a main antenna by multiple canceller loops fed by inputs from N separate auxiliary antennas. In practice, however, it has been found that conventional side-lobe canceller systems, using multiple auxiliary antennas whose positions are fixed relative to a main antenna, have limited effectiveness against multiple interference sources even when the number of auxiliary antenna-canceller loop combinations equals or slightly exceeds the number of interference sources present. Generally, the auxiliary antennas are situated symmetrically about the main antenna to provide coverage in all directions. However, the performance of such a multiple loop canceller system has been found to vary greatly with the direction of jammer attack and jammer spacing. Significantly degraded performance has been particularly noted in systems subject to interference from a plurality of closely spaced jammers (interference sources) where two in line auxiliary antennas receive nearly the same relative phases. Since canceller loops cannot change the relative phases of their received signals in such a situation, the action of the canceller loops are redundant and their combined performance is substantially equivalent to that of only one antenna-loop combination. As a result, present systems are incapable of adequately protecting receiving systems against sophisticated multiple interference countermeasure techniques.

Accordingly, the present invention has been developed to overcome the specific shortcomings of the above known and similar techniques and to provide a new technique for improving the performance and versatility of a canceller system in a multiple signal environment.

SUMMARY OF THE INVENTION

It is therefore an object of the present invention to provide a technique for improving interference suppression which is highly reliable and easily implemented using conventional elements.

Another object of the invention is to improve canceller system positioning and performance in a multiple source environment.

A further object of the invention is to provide a technique for improving the auxiliary antenna configuration in a sidelobe canceller system.

Yet another object of the invention is to provide a technique for improving cancellation from an auxiliary antenna configuration subjected to a plurality of closely spaced interference sources.

In order to accomplish the above and other objects, the auxiliary receiving antennas of a side-lobe canceller system are arranged preferably in a substantially symmetric configuration spaced about a main antenna such that no lines of sight through any two auxiliary antennas are collinear or parallel to a line of sight through any other two auxiliary antennas. The configuration is then arranged such that the line of signet between any two auxiliary antennas is not substantially parallel with the dominant direction of jammer (interference) attack, but rather tends to form the greatest possible angles with a line indicating the azimuthal direction of dominant jammer attack from the radar antenna phase center. With this configuration and positioning, the redundancy of canceller loop operation is substantially reduced and the cancellation improved for any number of side-lobe canceller loop-auxiliary antenna combinations used.

Other objects, advantages and novel features of the invention will become apparent from the following detailed description of the invention when considered with the accompanying drawings wherein:

BRIEF DESCRIPTION OF THE DRAWING

The drawing illustrates a preferred embodiment of the configuration and position of the auxiliary antennas in practicing the inventive technique.

DETAILED DESCRIPTION OF A PREFERRED EMBODIMENT

Referring now to the drawing, a schematic diagram shows a preferred embodiment of the technique for improving interference suppression according to the present invention. In the present example, the invention will be described with reference to a radar system although the inventive teachings are equally applicable to other types of receiving systems. Generally, the system includes a main receiving channel sensor in the form of a directional radar antenna 10 and a plurality of auxiliary receiving channel sensors in the form of omnidirectional antennas 11-13 distributed in space about main antenna 10. While the system being described only refers to the main antenna as a receiving antenna, the antenna could just as well be modified in a conventional manner to both transmit and receive. The main radar antenna 10 forms the main channel sensor for receiving radar signals and any interference that may be present in the side-lobes, while the auxiliary antennas 11-13 form the auxiliary channel sensors for receiving primarily interference signals as samples of the multiple interference source environment in which the radar is attempting to operate. In the present example, the three auxiliary antennas receiving interference from three jammers are shown symmetrically spaced about the main antennas to form the corners of an equilateral triangle as would be seen from above the main antenna. While only three auxiliary antennas are shown, any number of auxiliary antennas could be used with the number usually being at least equal to the number of interference sources present during operation.

While not shown in the drawing, the outputs of the auxiliary antennas 11-13 and main antenna 10 are coupled to the canceller loops of a multiple loop side-lobe canceller system in a conventional manner. Such systems are generally wellknown, as exampled by U.S. Pat. No. 3,202,990, and will therefore not be discussed in great detail. Generally, however, such systems phase shift and amplitude weight the auxiliary signals from antennas 11–13 before subtracting the same from the main channel signal from 10, to decorrelate the main channel output and thereby reduce interference. Such systems may take the form of the above referenced patent or systems as disclosed in copending U.S. application Ser. Nos. 499,260 entitled "Improved Sidelobe Canceller System" to Bernard L. Lewis and Irwin D. Olin and 499,374 entitled "Modified Sidelobe Canceller System" to Bernard L. Lewis, filed in the U.S. on Aug. 16, 1974, and assigned to the same assignee as the present application.

According to the particular embodiment shown, the antennas 11–13 are mounted on a platform and preferably in the noted configuration such that no lines of sight through any two auxiliary antennas are collinear or parallel to a line of sight through any other two auxiliary antennas. The platform can be any conventional mechanical structure for rotating the auxiliary antenna assembly symmetrically about the main antenna 10. This rotation can be most simply preformed by manual control of a motor generally represented as position control 15 in the drawing. At the same time, the position control delivers electrical signals to a plan position indicator 16 to form an overlay indicating auxiliary antenna positioning relative to the main antenna on the radar screen. In addition, a conventional jammer strobe indicator can be used to supply signals to the plan position indicator to indicate the dominant direction of jammer attack.

According to the inventive techniques, after first arranging the auxiliary antennas on the platform around the main radar antenna preferably such that no lines of sight through any two auxiliary antennas are collinear or parallel to a line of sight through any other two auxiliary antennas, the dominant direction of jammer attack is established by observation of the jam strobe on the position indicator screen. The antenna configuration is then rotated relative to the main antenna 10 such that the line of sight direction between any two auxiliary antennas is not substantially parallel to the dominant direction of jammer attack and preferably makes the largest possible angles with the direction of the jam strobe indication. In the present invention, this would occur for the current configuration when any of the lines 17, as labeled in the drawing, pointed in the direction of jam strobe indication of dominant jammer attack. In this position, the relative jammer phases are not so close as to cause the canceller loops to be redundant and thereby degrade the performance of the canceller system.

As can be seen from the above discussion, the increase in cancellation is obtained as a horizontal line of sight between any two auxiliary antennas is moved away from being substantially parallel with a dominant jammer attack direction (measured as a horizontal azimuth direction from the main antenna phase center), which parallel condition represents the worst condition for cancellation. While the optimum position for any configuration of auxiliary antennas is hard to predict, the movement away from parallel to a position forming the greatest angles with the attack direction, represents an improvement over the worst condition. In addition, while the invention has particular applicability to situations where interference is provided by closely spaced jammers (e.g. ½–2 radar beamwidth spacing over an arc up to about 10 beamwidths as measured from the radar antenna phase center), the same inventive technique is applicable as long as dominant directions of jammer ,attack can be determined. In situations where closely spaced jammers are equally spaced equal power jammers, the dominant direction as indicated by the jammer strobe will be a line from the radar antenna phase center to the midpoint between the jammers. In other situations where unequal power and spacing occurs,, the dominant direction will generally be a resultant vector of the plural jammers. In still other situations the condition may exist where there are a plurality of groups of closely spaced jammers forming a plurality of dominant directions, or a plurality of single jammers spaced so that a resultant vector is zero or meaningless. In such cases, the inventive technique provides for improving cancellation by positioning the antennas such that the line of sight between any two auxiliary antennas is not substantially parallel to any of the dominant directions or not substantially parallel to any jammer direction as the situation may warrant. It should be noted that for purposes of determining whether lines of sight are parallel or collinear according to the present invention, all lines of sight are viewed as horizontal lines lying in the same horizontal plane (i.e. as if all auxiliary antennas were in the same horizontal plane). Likewise, for comparing the lines of sight between auxiliary antennas with the direction of jammer attack, the lines between auxiliary antennas and the line representing the azimuthal attack direction are viewed as horizontal lines lying in the same horizontal plane. It should be additionally noted that while the actual worst case condition for cancellation exists when the line of sight between any two auxiliary antennas intercepts the jammer source, the line indicating the azimuthal direction of a jammer source from the radar phase center is substantially parallel to a line of sight intercepting two auxiliary antennas and the jammer source, for such spacings of auxiliary and primary antennas and jammer distances as would be practically encountered in conventional sidelobe canceller operation (e.g. auxiliary antennas spaced up to distances of about three wavelengths (at operating frequency) from the main antenna). The reference line for auxiliary antenna positioning was therefore made as the line indicating the azimuthal direction of the jammers from the primary antenna phase center, since the same can easily be determined with a conventional jam strobe.

While the invention has been described with particular reference to rotation of an entire symmetrical antenna configuration, it is within the scope of the inventive teachings to move one or more selected auxiliary antennas of a given configuration to new positions which cause the total configuration to have the positioning necessary for improved cancellation according to the present invention. In addition, several additional auxiliary antennas, positioned intermediate to existing antennas of a given configuration, could be switched into a side-lobe canceller system in place of poorly located auxiliary antennas to modify the configuration positioning.

Obviously many other modifications and variations of the present invention are possible in light of the above teachings. It is therefore to be understood that within the scope of the appended claims this invention may be practiced otherwise than as specifically described.

I claim:

1. A method for improving interference suppression comprising:

positioning a primary receiving sensor in a multiple signal source environment;

placing a plurality of auxiliary receiving sensors about said primary sensor;

receiving signals from desired and interference sources at said primary sensor to form a main channel output;

receiving signals primarily from interference sources at said auxiliary sensors;

supplying said primary and auxiliary sensor interference signals to a canceller system and cancelling interference in said main channel output;

establishing a dominant azimuthal direction of interference source position along a horizontal line of sight through said primary sensor; and arranging said auxiliary sensors about said primary sensor such that a horizontal line of sight through any two auxiliary sensors is not substantially parallel to the horizontal line indicating said azimuthal direction when viewed in the same horizontal plane.

2. The method of claim 1 further including the step of forming a configuration of said auxiliary sensors about said primary sensor such that a horizontal line of sight through any two auxiliary sensors is not parallel to a horizontal line of sight between any other two auxiliary sensors when viewed in the same horizontal plane.

3. The method of claim 2 wherein the step of arranging comprises, arranging said auxiliary sensors about said primary sensor such that horizontal lines of sight through any two auxiliary sensors form the largest possible angles with said horizontal line indicating said azimuthal direction when viewed in the same horizontal plane.

4. The method of claim 3 wherein the step of arranging further comprises, arranging said auxiliary sensors symmetrically about said primary sensor.

5. The method of claim 4 wherein the step of establishing comprises, establishing a plurality of azimuthal directions of interference source positions along horizontal lines of sight through said primary sensor, and wherein the step of arranging comprises, arranging said auxiliary sensors about said primary sensor such that a horizontal line of sight through any two auxiliary sensors is not substantially parallel to a horizontal line indicating any of said azimuthal directions when viewed in the same horizontal plane.

6. The method of claim 5 further including the steps of constructing said primary sensor as a directional antenna and constructing said auxiliary sensors as omni-directional antennas.

7. The method of claim 6 wherein the step of supplying comprises, supplying interference signals from said directional and omni-directional antennas to a side-lobe canceller system to cancel interference in said main channel output.

8. A method for improving interference suppression comprising:

positioning a primary receiving sensor in a multiple signal source environment;

placing a plurality of auxiliary receiving sensors about said primary sensor;

receiving signals from desired and interference sources at said primary sensor to form a main channel output;

receiving signals primarily from interference sources at said auxiliary sensors;

supplying said primary and auxiliary sensor interference signals to a canceller system and cancelling interference in said main channel output;

establishing a dominant azimuthal direction of interference source position along a horizontal line of sight through said primary sensor;

arranging said auxiliary sensors in a configuration about said primary sensor such that a horizontal line of sight through any two auxiliary sensors is not parallel to a horizontal line of sight between any other two auxiliary sensors when viewed in the same horizontal plane; and moving said configuration relative to said primary sensor such that a horizontal line of sight through any two auxiliary sensors is not substantially parallel to the horizontal line indicating said azimuthal direction when viewed in the same horizontal plane.

* * * * *